United States Patent
Huang et al.

(10) Patent No.: US 11,115,595 B2
(45) Date of Patent: Sep. 7, 2021

(54) PRIVACY-AWARE IMAGE ENCRYPTION

(71) Applicant: MEDIATEK INC., Hsinchu (TW)

(72) Inventors: Chung-Wen Huang, Hsinchu (TW); Hung-Jen Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/558,567

(22) Filed: Sep. 3, 2019

(65) Prior Publication Data

US 2021/0067699 A1    Mar. 4, 2021

(51) Int. Cl.
*H04N 5/232* (2006.01)
*G06F 21/62* (2013.01)
*H04N 5/91* (2006.01)

(52) U.S. Cl.
CPC ..... *H04N 5/23293* (2013.01); *G06F 21/6218* (2013.01); *H04N 5/23219* (2013.01); *H04N 5/91* (2013.01)

(58) Field of Classification Search
CPC .................................. H04N 5/23293
USPC .................................... 348/333.02
See application file for complete search history.

(56) References Cited

U.S. PATENT DOCUMENTS

| 7,787,762 B2 | 8/2010 | Abe |
| 2008/0267403 A1* | 10/2008 | Boult .......... H04L 9/0894 380/255 |
| 2014/0178050 A1 | 6/2014 | St. Clair |

FOREIGN PATENT DOCUMENTS

| CN | 103942469 A | 7/2014 |
| CN | 108197453 A | 6/2018 |

OTHER PUBLICATIONS

Chinese language office action dated Jun. 24, 2020, issued in application No. TW 108138592.

* cited by examiner

*Primary Examiner* — Joel W Fosselman
(74) *Attorney, Agent, or Firm* — McClure, Qualey & Rodack, LLP

(57) ABSTRACT

An electronic device is provided. The electronic device includes a controller, configured to receive an input image signal captured by a camera device, perform a codec process on the input image signal to generate a processed file. The controller is further configured to perform privacy detection on the input image signal or the processed file. In response to the input image signal or the processed file being detected to include privacy information, the controller is further configured to encrypt the processed file to generate an encrypted file.

20 Claims, 6 Drawing Sheets

PRIVACY-AWARE IMAGE ENCRYPTION

BACKGROUND OF THE DISCLOSURE

Field of the Disclosure

The disclosure relates to encryption systems, and, in particular, to a controller and a privacy-aware image-encryption method of automatically recognizing and encrypting an image or video having privacy information.

Description of the Related Art

As technology advances, mobile devices that are equipped with camera devices are becoming more and more popular. It is common for people to record their intimate moments or private documents as photos. These photos are of an extremely private nature and should be kept secure from others. In addition, these photos are usually automatically uploaded to a cloud server by an image-uploading program or an image-backup program while these photos are stored in the storage device of the electronic device. However, it is difficult to manage these private photos after they have been uploaded to the cloud server, and there is also a risk that these private photos may be exposed to others.

Accordingly, there is demand for an electronic device and privacy-aware image-encryption to solve the aforementioned problem.

BRIEF SUMMARY OF THE DISCLOSURE

A detailed description is given in the following embodiments with reference to the accompanying drawings.

In an exemplary embodiment, an electronic device is provided. The electronic device includes a controller, configured to receive an input image signal captured by a camera device, perform a codec process on the input image signal to generate a processed file. The controller is further configured to perform privacy detection on the input image signal or the processed file. In response to the input image signal or the processed file being detected to include privacy information, the controller is further configured to encrypt the processed file to generate an encrypted file.

In another exemplary embodiment, a privacy-aware image-encryption method for use in an electronic device is provided. The electronic device includes a camera device. The method includes the steps of: receiving an input image signal captured by a camera device; performing a codec process on the input image signal to generate a processed file; performing privacy detection on the input image signal or the processed file; and in response to the input image signal or the processed file being detected to include privacy information, encrypting the processed file to generate an encrypted file.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

Figure 1:
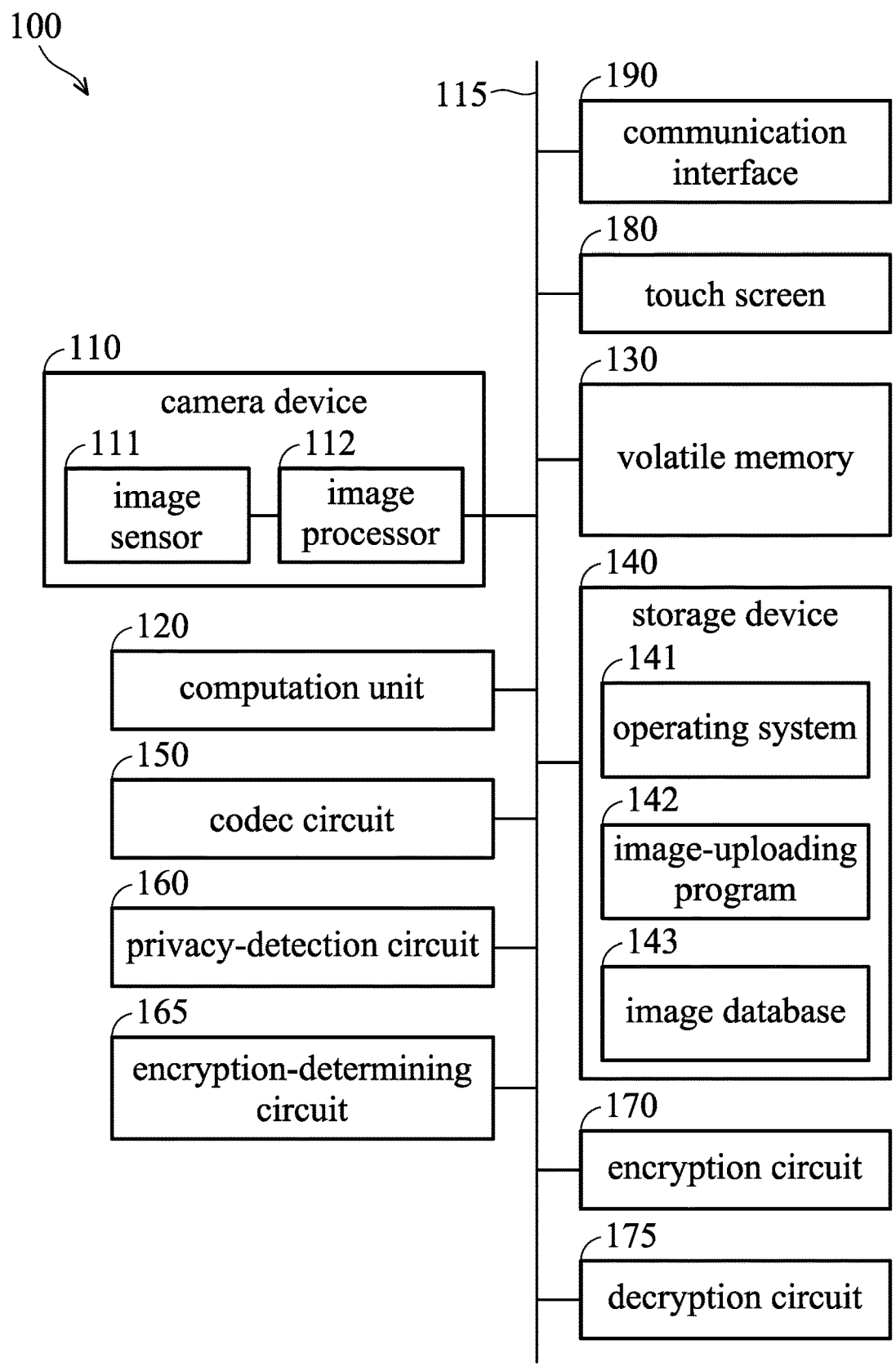
FIG. 1 is a block diagram of an electronic device in accordance with an embodiment of the disclosure.

FIG. 1 is a block diagram of an electronic device in accordance with an embodiment of the disclosure. The electronic device 100 may be a portable electronic device such as a smartphone or a tablet PC, but the invention is not limited thereto. As illustrated in FIG. 1, the electronic device 100 includes a camera device 110, a volatile memory 130, a storage device 140, a codec circuit 150, a privacy-detection circuit 160, an encryption-determining circuit 165, and an encryption circuit 170, a touch screen 180, and a communication interface 190. The components in the electronic device 100 may communicate with each other via bus 115.

Figure 6:
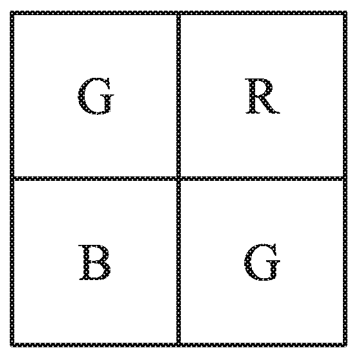
FIG. 6 is a diagram of a Bayer pattern.

The camera device 110 is configured to capture an image for a scene. For example, the camera device 110 includes an image sensor 111 and an image processor 112. The image sensor 111 may be implemented by a charged coupled device (CCD) sensor or a complementary metal oxide semiconductor (CMOS) sensor, but the invention is not limited thereto. The image sensor 111 may be overlaid with a color filter array (CFA) for obtaining three or more color components, for example, but not limited thereto, red, green, and blue. The most commonly used CFA configuration is the Bayer configuration, as illustrated in FIG. 6. It has a pattern of four pixels arranged in a square, two opposite corners being occupied by green pixels, the other two corners being occupied by a red pixel and a blue pixel. This configuration takes into account that the human eye is more sensitive to green than to red or blue. The image sensor 111 is configured to convert incident radiation into raw image data. For example, when reading out the image sensor, each pixel provides a raw color value, corresponding to the brightness of the part of the radiation ray having a color corresponding to the color filter overlaying the pixel.

The image processor 112 may be an image signal processor (ISP), a digital signal processor (DSP), a microcontroller (MCU), but the invention is not limited thereto. The image processor 112 may perform a demosaicking process on the captured raw image data from the image sensor 111 to generate an image signal. For example, the demosaicking process is a process of color reconstruction for reconstructing a full color image from the raw image data (i.e., an incomplete color samples) from the image sensor 111 overlaid with a color filter array. The image processor 112 may perform one of well-known demosaicking techniques to demosaic the raw image data to generate an image signal.

The computation unit 120 can be implemented in various manners, such as dedicated hardware circuits or general-purpose hardware (for example, a single processor, a multi-processor capable of performing parallel processing, a graphics processor, or another processor with computation capability), and may provide the functions described below when executing the code or software related to each program and process of the present invention.

The touch screen 180 may be a display panel integrated with a touch device (not shown), and the display panel may be implemented by a liquid crystal display (LCD) panel, a light-emitting diode (LED) display panel, or an organic light-emitting diode (OLED) display panel, E-ink, etc., but the invention is not limited thereto. The touch screen 180 is capable of displaying the image from the camera device 110 for image previewing, and displaying the image from the computation unit 120, such as decrypted and uncompressed image or video signals and/or user interfaces. The touch screen 180 is also capable of detecting touch actions performed on the surface of the touch screen, and the computation unit 120 may perform corresponding operations in response to the touch operations. The communication interface 190 may include one or more transceivers supporting wired or wireless communication protocols, and the electronic device 100 may connect to a cloud server (not shown) via the communication interface 190.

The volatile memory 130 may be implemented by a random access memory such as a static random access memory (SRAM) or a dynamic random access memory (DRAM), but the invention is not limited thereto. The volatile memory 130, for example, is capable of temporarily storing intermediate data and images in the privacy-detection and encryption procedure, and processed files (e.g., compressed/uncompressed image files and video bitstreams) in the codec process.

The storage device 140, for example, may be a non-volatile memory such as a hard disk drive, a solid-state disk, a flash memory, or a read-only memory, but the invention is not limited thereto. The storage device 140 is configured to store an operating system 141 and an image-uploading program 142. The operating system 141 may be an operating system for mobile devices, such as iOS, ANDROID, or Windows 10 Mobile, but the invention is not limited thereto.

The codec circuit 150 may be a dedicated hardware circuit capable of encoding an input image signal or video signal to generate a compressed image or a video bitstream. In addition, the codec circuit 150 is further capable of decoding a compressed image or a video bitstream to reconstruct the original image or video signal. For example, the codec circuit 150 may obtain the image or video signal from the image processor 112 of the camera device 110. Alternatively or additionally, the codec circuit 150 may obtain the image or video from the volatile memory 130 or from an image buffer (not shown) of the camera device 110. In some embodiments, the codec circuit 150 may also be capable of outputting the input image signal in an uncompressed image format such as BMP or RAW.

The privacy-detection circuit 160 is configured to detect privacy information from the image or video signal from the image processor 112 of the camera device. Alternatively or additionally, privacy-detection circuit 160 may obtain the image or video signal from the volatile memory 130 or from an image buffer (not shown) of the camera device 110. For example, the privacy information may include, but is not limited to, a nude scene, texts, adult content, or one or more specific users, objects, or scenes defined by the user. Specifically, the privacy-detection circuit 160 may perform privacy detection on the image signal in synchronization with the encoding operation performed on the image or video signal by the codec circuit 150. For example, each image in the video signal from the camera device 110 may include a frame number, so that the codec circuit 150, the privacy-detection circuit 160, and the encryption-determining circuit 165 may coordinate with each other using the frame number. In some embodiments, the privacy-detection circuit 160 may perform privacy detection on the processed file (e.g., compressed image or a video bitstream) temporarily stored in the volatile memory 130.

In an embodiment, the privacy-detection circuit 160 may include one or more classifiers to classify the image data into a predefined case such as different types of privacy information as described above or none of the aforementioned types, thereby generating a classification result. The aforementioned classifiers may be implemented by a classifier network using artificial intelligence algorithms such as neural networks, fuzzy logics, principle component analysis (PCA), support-vector machines (SVM), K-Nearest neighbors, logistic regression, etc., but the invention is not limited thereto.

Specifically, in an embodiment, the classifier network may be in the form of neural networks which operates depending on a value set. For example, the value set is a collection of specific feature values that define a plurality of nodes in the classifier network, and the classifier network may generate a classification result in response to the input value set which reflects the training results of a default set and a user-defined set. The default set may be provided by the vendor or manufacturer of the electronic device 100, and may include default classification objects such as nude human bodies, texts, sexual scenes, underwear scenes, etc., but the invention is not limited thereto.

The encryption-determining circuit 165 is capable of determining, according to the classification result from the privacy-detection circuit 160, whether encryption of the image or video file processed by the codec circuit 150 is required prior to storing the processed image or video file in the storage device 140. Specifically, the classification result may be an encryption flag (i.e., an one-bit flag of 0 or 1), and the encryption-determining circuit 165 is further capable of controlling the encryption circuit 170 to encrypt the processed image or video file from the codec circuit 150 according to the classification result, and the details will be described in the following sections.

The encryption circuit 170 is capable of encrypting a file, which may be any type of files, using a well-known encryption algorithm such as a symmetric-key encryption algorithm (e.g., AES, RC4, DES, RC5, RC6, etc.) or an asymmetric-key encryption algorithm (e.g., RSA, DSA, PKCS, etc.). In some embodiments, for purposes of description, the encryption circuit 170 may implement the AES algorithm (e.g., AES-128, AES-192, or AES-256) for a better performance than asymmetric-key encryption algorithms, where the key of the encryption circuit 170 may be a password defined by the user.

In an embodiment, a decryption circuit 175 corresponding to the encryption circuit 170 may also be disposed in the electronic device 100 to decrypt the encrypted file stored in the storage device 140 using the user-defined password.

In an embodiment, if the classification result generated by the privacy-detection circuit 160 indicates that the image signal or the processed file does not include any of the aforementioned types of privacy information, the encryption-determining circuit 165 may control the codec circuit 150 to store the generated processed image file (i.e., may be a compressed or uncompressed image file) to the image database 143 (e.g., an image album) of the storage device 140. If the classification result generated by the privacy-detection circuit 160 indicates the image signal or the processed image file includes any of the aforementioned types of privacy information, the codec circuit 150 may still generate a processed image file which is temporarily stored in the volatile memory 130. Then, the encryption-determining circuit 165 may control the codec circuit 150 to forward the processed image file to the encryption circuit 170, and the encryption circuit 170 may encrypt the processed image file using a predetermined encryption algorithm (e.g., AES-256) and save the encrypted processed image file to the image database 143 of the storage device 140.

Specifically, the image-uploading program 142 executed by the computation unit 120 may detect whether any new image or video file with a known filename extension has been stored in the storage device 140. For example, image and video files with known filename extensions, such as JPG, PNG, BMP, RAW, GIF, TIFF, MPG, MP4, FLV, AVI, MOV, WMV, RM, MKV, etc., may be stored in the storage device 140, but the invention is not limited to the aforementioned filename extensions.

If the image-uploading program 142 executed by the computation unit 120 detects that any new image or video file with a known filename extension has been stored in the storage device 140, the image-uploading program 142 may then upload the new image or video file to a cloud server. However, if the captured image or video includes privacy information, it may be desirable for the user not to upload the captured image or video to the cloud server. Thus, the encryption-determining circuit 165 may determine, according to the classification result from the privacy-detection circuit 160, whether encryption of the image or video file processed by the codec circuit 150 is required prior to storing the processed image or video file in the storage device 140 so as to prevent from detecting and uploading of image or video file including any privacy information by the image-uploading program 142.

If the encryption-determining circuit 165 determines that encryption of the image or video file processed by the codec circuit 150 is required prior to storing the processed image or video file in the storage device 140, the encryption-determining circuit 165 may control the codec circuit 150 to forward the processed image or video file to the encryption circuit 170, so that the encryption circuit 170 may encrypt the processed image or video file, and save the encrypted image or video file to the storage device 140 with another filename extension indicating an encrypted file (i.e., may be a well-known or user-defined filename extension).

Figure 2:
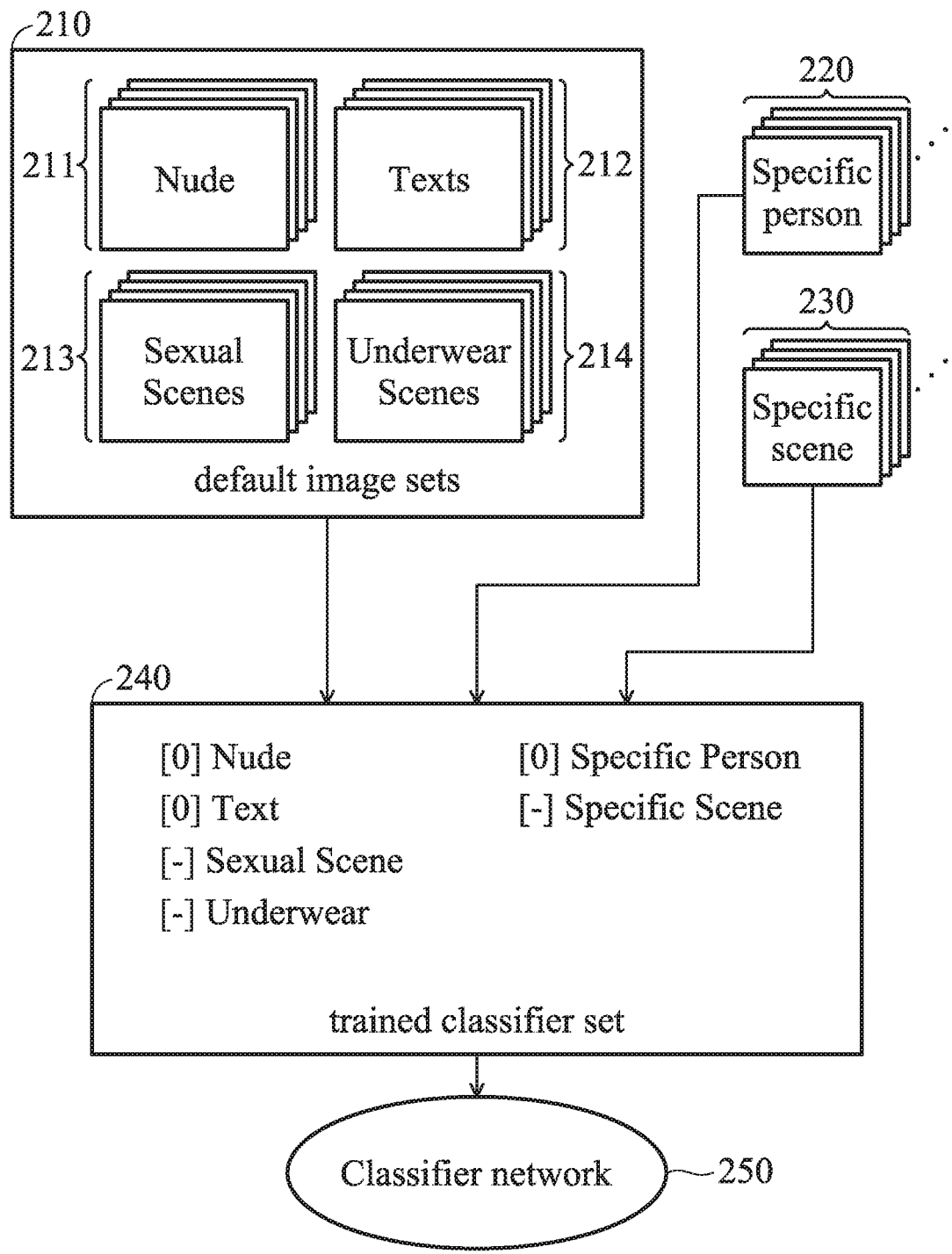
FIG. 2 is a diagram of the classifier network in accordance with an embodiment of the invention.

FIG. 2 is a diagram of the classifier network in accordance with an embodiment of the invention. For example, the classifier network in the privacy-detection circuit 160 may include one or more classifiers, and each classifier may be trained according to a respective predetermined image set. Specifically, some of the predetermined image sets (i.e., default image sets 210) may be provided by the vendor of the electronic device 100, and these predetermined image sets may be regarded as training images for default classification types such as a nude human body (image set 211), text (image set 212), sexual scene (image set 213), underwear scene (image set 214), etc., but the invention is not limited thereto.

Additionally, some of the predetermined image sets may be provided by the user, and these predetermined image sets may be regarded as training images for user-specific classification types such as a specific person (image set 220) or a specific scene (image set 230). In an example, the image set 220 may include facial images of a specific person such as the user's wife, and the image set 230 may include images of a specific scene such as the bathroom in the user's house. It should be noted that the training of a classifier in the classifier network may require a sufficient amount of images such as hundreds or thousands of images of a specific person or specific scene to reach a reasonable recognition rate.

In some embodiments, the classifiers corresponding to the image sets 211-214 in the default images set 210 are trained in advance by the manufacturer of the electronic device 100, as depicted in FIG. 2. Thus, before the electronic device 100 is to be sold on the market, the privacy-detection circuit 160 of the electronic device 100 may be equipped with classifiers corresponding to the image sets 211-214 for detecting privacy information such as nude human bodies, texts, sexual scenes, and underwear scenes. Additionally, after the user has purchased the electronic device 100, the user may utilize the electronic device 100 to capture training images of a specific person and/or specific scene that is defined as a user-specific category, and input the training images to a newly defined classifier in the classifier network. Upon training of the newly defined classifier is completed, the newly defined classifier can be added to the trained-classifier set 240. In the embodiment, the classifiers for the specific person and the specific scene are trained and added into the trained-classifier set 240.

Furthermore, the user may enable each of the trained classifiers by selecting the corresponding option in a user interface. As depicted in FIG. 2, the default classifiers for detecting nude human bodies and texts are enabled, and the default classifier for detecting sexual scenes and underwear scenes are disabled. Meanwhile, the user-defined classifier for detecting the specific person is enabled, and the user-defined classifier for detecting the specific scene is disabled. Accordingly, the classifier network 250 in the privacy-detection circuit 160 may be set to include classifiers for detecting images including nude human bodies or texts.

Figure 3A:
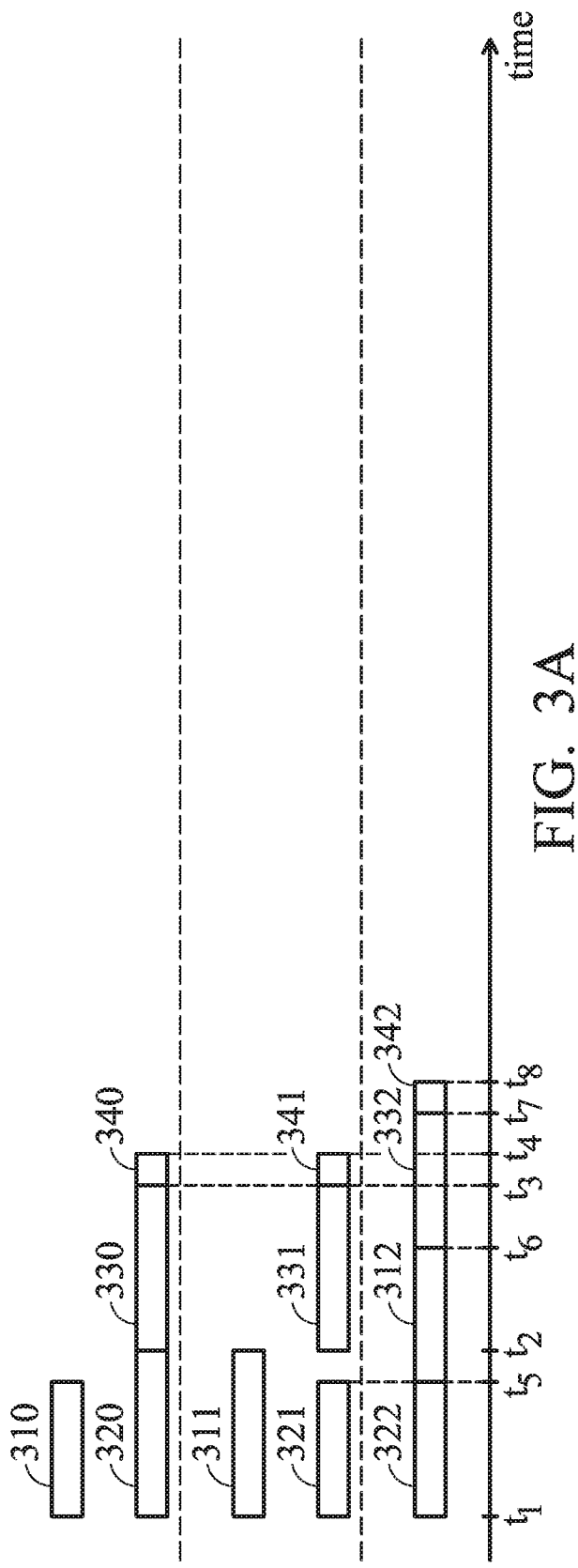
FIG. 3A is a timing diagram of the encryption mechanism for image capturing in accordance with an embodiment of the invention.

FIG. 3A is a timing diagram of the encryption mechanism for image capturing in accordance with an embodiment of the invention.

Referring to the upper portion of FIG. 3A, in an embodiment, the image signal captured by the camera device 110 may be stored in the volatile memory 130, and image signal stored in the volatile memory 130 can be sent to the codec circuit 150 and the privacy-detection 160 at time t1. Thus, the codec circuit 150 may start to perform codec process 320 on the captured image at time t1, and the privacy-detection circuit 160 may start to perform a privacy-detection process 310 on the captured image at time t1. However, the time required for the codec process 320 performed by the codec circuit 150 may be not equal to that for the privacy-detection process 310 performed by the privacy-detection circuit 160.

In the embodiment, the privacy-detection process 310 performed by the privacy-detection circuit 160 ends at time t5, and the classification result may be a "1" which indicates that the current image may contain privacy information. The codec process 320 performed by the codec circuit 150 ends at time t2 which is later than time t5. Accordingly, the encryption-determining circuit 165 may control the codec circuit 150 to forward the processed image file to the encryption circuit 170 in response to the classification result generated by the privacy-detection circuit 160, so that the encryption circuit 170 may start to perform an encryption process 330 on the processed image file at time t2. At time t3, the encryption process 330 performed by the encryption circuit 170 ends. The encryption circuit 170 may start to store the encrypted processed image file in the storage device 140 (i.e., storing process 340) at time t3, and the encrypted processed image file is fully stored in the storage device 140 at time t4.

Referring to the middle portion of FIG. 3A, in another embodiment, the image signal captured by the camera device 110 may be stored in the volatile memory 130, and image signal stored in the volatile memory 130 can be sent to the codec circuit 150 and the privacy-detection circuit 160 at time t1. Thus, the codec circuit 150 may start to perform codec process 321 on the captured image at time t1, and the privacy-detection circuit 160 may start to perform a privacy-detection process 311 on the captured image at time t1. However, the time required for the codec process 321 performed by the codec circuit 150 may be not equal to that for the privacy- detection process 311 performed by the privacy-detection circuit 160.

In the embodiment, the privacy-detection process 311 performed by the privacy-detection circuit 160 ends at time t2, and the classification result may be a "1" which indicates that the current image may contain privacy information. The codec process 321 performed by the codec circuit 150 ends at time t5 which is earlier than time t2. Accordingly, the encryption-determining circuit 165 may await the classification result generated by the privacy-detection circuit 160 until time t2, and then control the codec circuit 150 to forward the processed image file to the encryption circuit 170, so that the encryption circuit 170 may start to perform an encryption process 331 on the processed image file at time t2. At time t3, the encryption process 331 performed by the encryption circuit 170 ends. The encryption circuit 170 may start to store the encrypted processed image file in the storage device 140 at time t3 (i.e., storing process 341), and the encrypted processed image file is fully stored in the storage device 140 at time t4.

Referring to the lower portion of FIG. 3A, in yet another embodiment, the image signal captured by the camera device 110 may be stored in the volatile memory 130, and image signal stored in the volatile memory 130 can be sent to the codec circuit 150 at time t1. Thus, the codec circuit 150 may start to perform codec process 322 on the captured image at time t1, and the codec process 322 performed by the codec circuit 150 ends at time t5. The codec process 322 is followed by the encryption process 312. For example, the privacy-detection circuit 160 may perform the privacy-detection process 312 on the processed file output from the codec circuit 150 at time t5. At time t6, the privacy-detection process 312 ends, and the classification result may be a "1" which indicates that the processed file may contain privacy information. Then, the encryption circuit 170 may start the encryption process 332 at time t6, and the storing process 342 at time t7. The encryption circuit 170 may start to store the encrypted processed image file in the storage device 140 at time t7 (i.e., storing process 342), and the encrypted processed image file is fully stored in the storage device 140 at time t8.

Figure 3B:
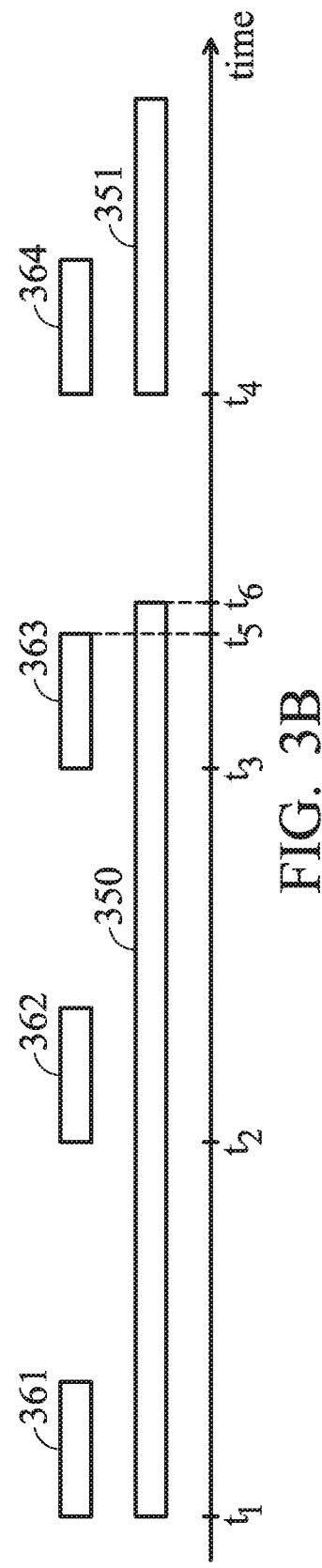
FIG. 3B is a timing diagram of the encryption mechanism for video recording in accordance with an embodiment of the invention.

FIG. 3B is a timing diagram of the encryption mechanism for video recording in accordance with an embodiment of the invention.

The encryption mechanism for video recording may be different from that for image capturing. For example, the encryption mechanism for image capturing is picture-based, and the codec process performed by the codec circuit 150 and the privacy-detection process performed by the privacy-detection circuit 160 can be performed separately in parallel. However, in the video recording, the video signal from the camera device 100 may include a plurality of frames. The incoming frame at time t from the camera device 110 may be not immediately encoded at time t since the video encoding process performed by the codec circuit 150 may have to buffer a plurality of frames in different times for temporal prediction. Thus, the incoming frame at time t may be encoded by the codec circuit 150 at a time later than time t, such as time t+1, t+2, etc., depending on the number of buffered frames and the algorithm used for encoding the video signal.

Referring to FIG. 3B, at time t1, the first frame of the video signal are simultaneously transmitted to the codec circuit 150 and the privacy-detection circuit 160, and the video encoding process 350 performed by the codec circuit 150 and the privacy-detection process 361 performed by the privacy-detection circuit 160 may be simultaneously started at time t1. It should be noted that the video encoding process 350 may be continuously performed until a stop action is detected by the codec circuit 150. The classification result of the privacy-detection process 361 may be a "0" which indicates no privacy information is included in the first frame of the video signal. The video bitstream generated by the codec circuit 150 is temporarily buffered in the volatile memory 130 and/or the storage device 140.

At time t2, the privacy-detection process 362 is performed on the second frame of the video signal by the privacy-detection circuit 160, and the classification result of the privacy-detection process 361 may be a "0" which indicates no privacy information is included in the second frame of the video signal. Meanwhile, the video encoding process 350 may be maintained.

At time t3, the privacy-detection process 363 is performed on the third frame of the video signal by the privacy-detection circuit 160, and the classification result of the privacy-detection process 363 may be a "1" which indicates one or more types of privacy information is included in the third frame of the video signal. For example, the privacy-detection circuit 160 may generate the classification result at time t5 which is earlier than time t4. In response to the classification result indicating "1", the encryption-determining circuit 165 may send an interrupt signal to the codec circuit 150 to stop video encoding process 350.

Specifically, due to temporal prediction used in the video encoding process 350, a predetermined number of frames in the video signal are buffered in the volatile memory 130 and/or the storage device 140. Thus, at time t3, the video encoding process 350 may start to encode the second frame of the video signal. In the embodiment, since the second frame of the video signal is detected not including privacy information, the codec circuit 150 may stop the video encoding process 350 in response to the encoding of the second frame of the video signal being completed, such as time t6. Accordingly, the encoded video file does not include any privacy information, and can be stored in the storage device 140.

In some embodiments, the video encoding process 350 may start to encode the third frame of the video signal that includes privacy information at time t3. In response to the classification result generated by the privacy-detection circuit 160 at time t5, the codec circuit 150 may immediately terminate the video encoding process 350, and discard the generated bitstream for the third frame. Then, the codec circuit 150 may restart another video encoding process 351 with the fourth frame of the video signal at time t4.

At time t4, the privacy-detection process 364 is performed on the fourth frame of the video signal by the privacy-detection circuit 160, and the classification result of the privacy-detection process 364 may be a "1" which indicates one or more types of privacy information is included in the fourth frame of the video signal. It may indicate that the encoded video file generated by the video encoding process 351 may still include the privacy information. As long as the video encoding process 351 is maintained by the codec circuit 150, the encryption-determination circuit 165 may force the codec circuit 150 to forward the generated video bitstream to the encryption circuit 170 no matter whether the classification result from the privacy-detection circuit 160 is 1 or 0.

Briefly, in response to detection of privacy information of the current frame, the video encoding process can be terminated after the encoding of the frame including no privacy information is completed. Alternatively, the video encoding process can be terminated immediately in response to the detection of privacy information of the current frame. If the current frame including the privacy information has been encoded, the codec circuit 150 may discard the generated bitstream corresponding to the current frame.

In another embodiment, since the video bitstream generated by the codec circuit 150 is temporarily stored in the volatile memory 130 and/or the storage device 140, the codec circuit 150 may continue the video encoding process 350 when privacy information is detected in any of the frame in the video signal being encoded. In addition, in response to the classification result being "1" during the encoding of the video signal, the encryption-determining circuit 165 may control the encryption circuit 170 to obtain the temporarily stored video bitstream from the volatile memory 130 and/or storage device 140 and encrypt the video bitstream to generate an encrypted video file. In some embodiments, in response to the classification result being "1" during the encoding of the video signal, the encryption-determining circuit 165 may prompt a software button on the touch screen 180 to inform the user whether to encrypt the currently recorded video. If the user presses the software button on the touch screen 180, the encryption-determining circuit 165 may control the encryption circuit 170 to obtain the temporarily stored video bitstream from the volatile memory 130 and/or storage device 140 and encrypt the video bitstream to generate an encrypted video file.

Figure 4:
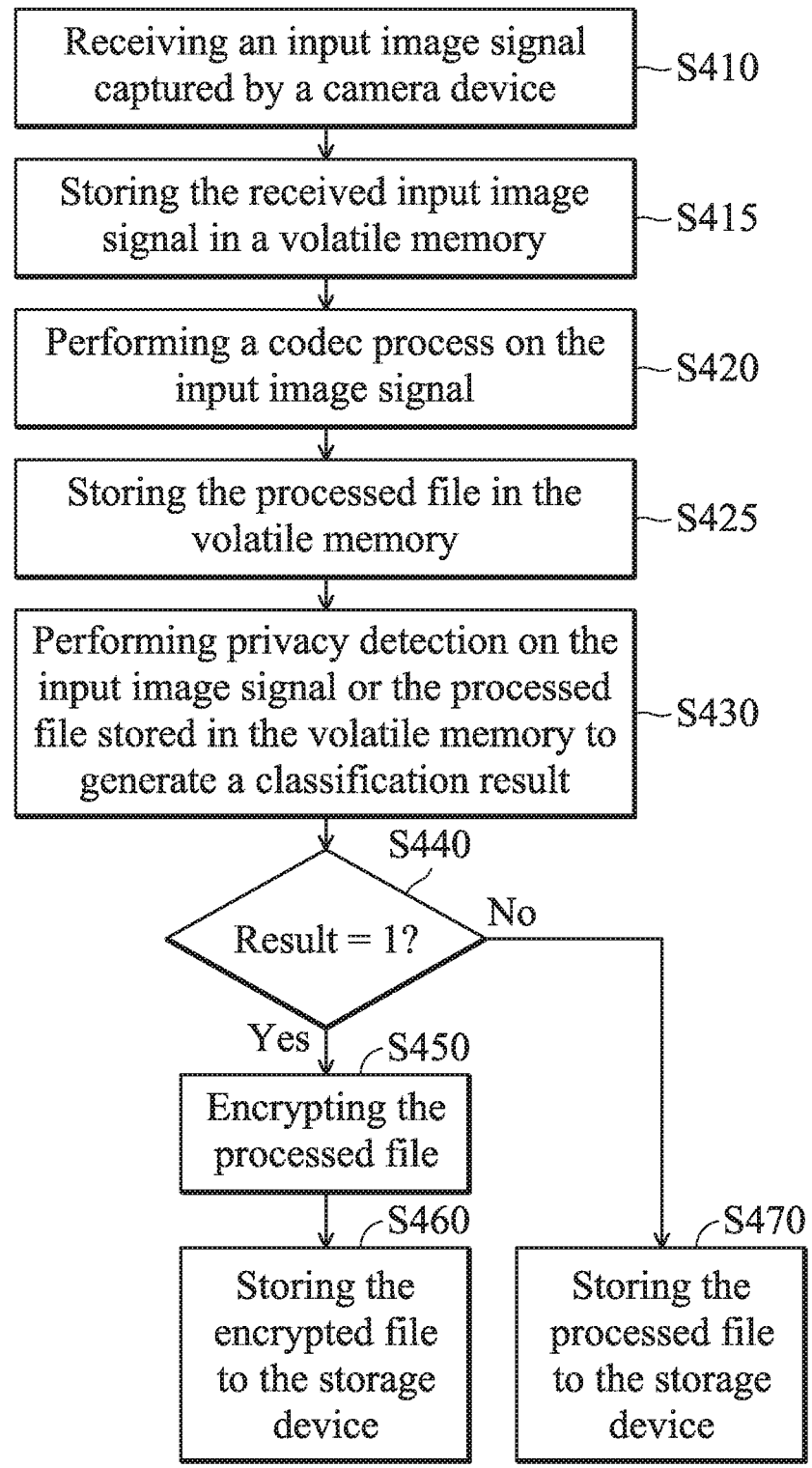
FIG. 4 is a flow chart of a privacy-aware image-encryption method in accordance with an embodiment of the invention.

FIG. 4 is a flow chart of a privacy-aware image-encryption method in accordance with an embodiment of the invention. The method in FIG. 4 can be applied to the image signal or video signal captured by the camera device 110.

Referring to FIG. 4, in step S410, an input image signal captured by the camera device 100 is received. In step S415, the received input image signal is stored in the volatile memory 130. For example, the input image signal captured by the camera device 110 is buffered in the volatile memory 130 for subsequent processes such as the codec process and privacy-detection process.

In step S420, a codec process is performed on the image signal to generate a processed file. For example, the camera device 110 may repeatedly capture an image in a predetermined rate, and the captured may form a video signal. The codec process in step S420 may be an image-codec process or a video-codec process depending on the image-capturing mode of the electronic device 100. The process file may be a compressed or compressed image file, or a video bitstream.

In step S425, the processed file is stored in the volatile memory 130. It should be noted that the input image signal and the processed file are temporarily stored in the volatile memory 130. When the processed file is not stored into the image database 143 (e.g., an image album) yet, the operating system 141 will not recognize the processed file temporarily stored in the volatile memory 130, thereby preventing the image-uploading program 142 from uploading the processed file containing privacy information to the cloud server.

In step S430, privacy detection is performed on the input image signal or the processed file to generate a classification result. For example, the classification result may indicate an encryption flag, where a "1" indicates the processed file generated by the codec circuit 150 should be encrypted by the encryption circuit 170, and a "0" indicates the processed file generated by the codec circuit 150 can be directly stored in the storage device 140.

In step S440, it is determined whether the classification result is equal to 1. For example, the classification result of "1" indicates the processed file generated by the codec circuit 150 include privacy information and should be encrypted by the encryption circuit 170, and the classification result of "0" indicates the processed file generated by the codec circuit 150 does not include privacy information and can be directly stored in the storage device 140. If the classification result is equal to 1, step S450 is performed. If the classification result is not equal to 1, step S470 is performed.

In step S450, the processed file is encrypted by the encryption circuit 170. For example, the encryption-determining circuit 165 may determine whether the codec circuit 150 should be controlled to forward the processed file to the encryption circuit 170 for encryption or whether the encryption circuit 170 may obtain the temporarily stored processed file from the volatile memory 130 and/or the storage device 140 to encrypt the processed file.

In step S460, the encrypted file is stored in the storage device 140. For example, the encrypted file stored in the storage device 140 may have a known filename extension indicating an encrypted file, and thus the encrypted file will not be recognized as an image file or video file by the operating system 141 or other applications.

In step S470, the processed file is stored in the storage device 140. For example, the processed file stored in the storage device 140 may have a known filename extension, such as JPG, PNG, BMP, RAW, GIF, TIFF, MPG, MP4, FLV, AVI, MOV, WMV, RM, MKV, etc., indicating an image file or video file, but the invention is not limited to the aforementioned filename extensions.

Figure 5:
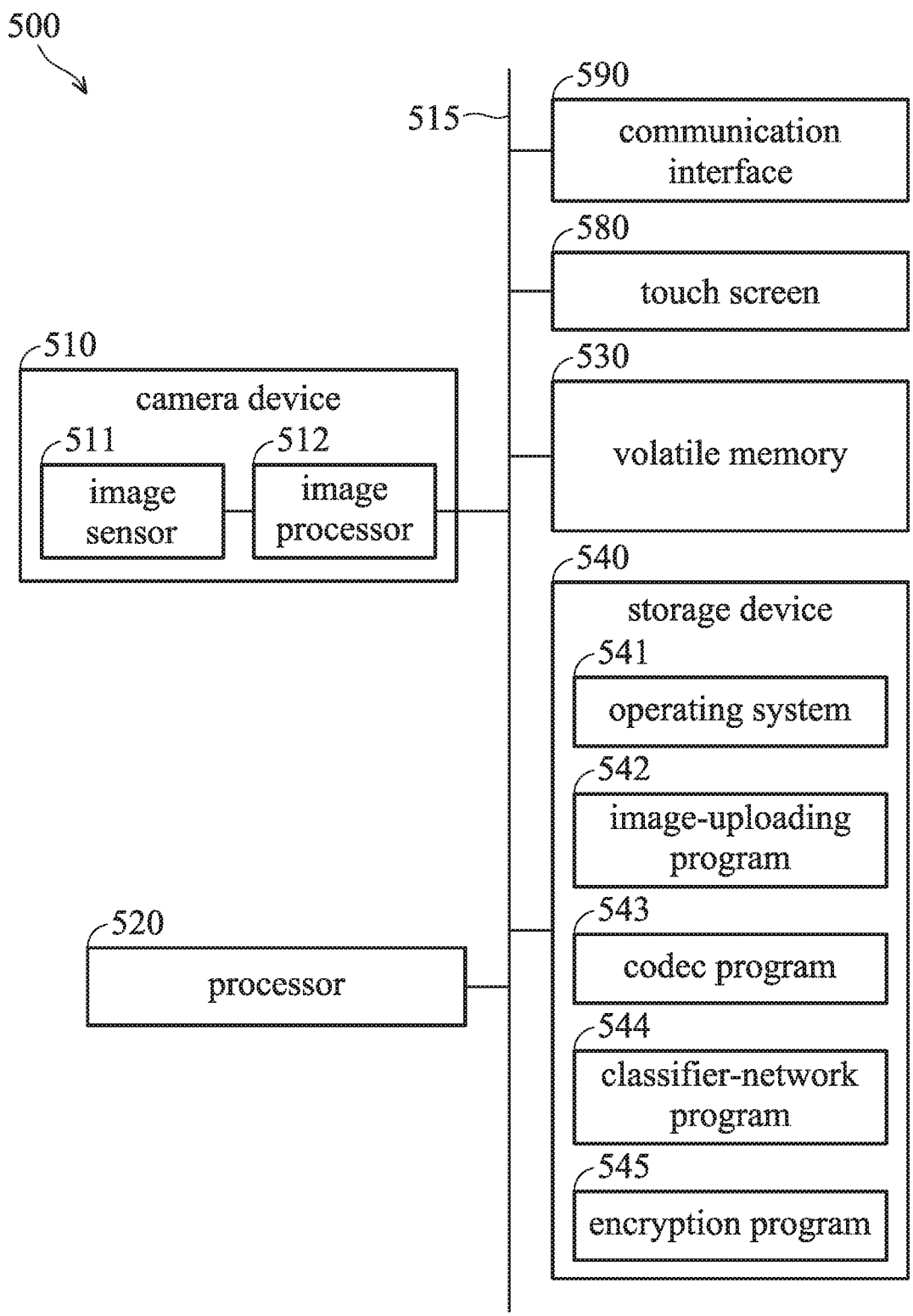
FIG. 5 is a block diagram of the electronic device in accordance with another embodiment of the invention.

FIG. 5 is a block diagram of the electronic device in accordance with another embodiment of the invention.

Referring to FIG. 1 and FIG. 5, some of functions of the electronic device 100 can be implemented by software. For example, the functions of the codec circuit 150, privacy-detection circuit 160, encryption-determining circuit 165, and encryption circuit 170 in the electronic device 100 of FIG. 1 can be implemented by the processor 520 in the electronic device 500 of FIG. 5. Additionally, the storage device 540 may further store a codec program 543, a classifier-network program 544, and encryption program 545. The processor 520 may execute the codec program 543 to perform the codec process as executed by the codec circuit 150. The processor 520 may load a classifier-network program 544 to perform privacy detection on the captured image or video signal from the camera device 510. In addition, the processor 520 may also load the encryption program 545 to perform encryption on the processed file output by the codec program 543. Since the functions of the electronic device 500 are similar to those of the electronic device 100, the details will be omitted here.

In view of the above, an electronic device and a privacy-aware image-encryption method are provided. The electronic device and method are capable of detecting privacy information from the captured image or video signal from the camera device, and immediately encrypting the image or video file processed by the codec circuit or program in response to a classification result generated by the privacy detection circuit or program indicating privacy information being detected, thereby protecting the image file or video file including the privacy information from being accessed by others, and preventing the image file or video file from being automatically uploaded to a cloud server due to the automatic image-uploading function of the electronic device.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a controller, configured to receive an input image signal captured by a camera device and perform a codec process on the input image signal to generate a processed file,
wherein the controller is further configured to perform privacy detection on the input image signal or the processed file, wherein the controller performs the privacy detection using a classifier network that includes a plurality of classifiers,
wherein in response to the input image signal or the processed file being detected to include privacy information, the controller is further configured to encrypt the processed file to generate an encrypted file.

2. The electronic device as claimed in claim 1, wherein the controller is further configured to temporarily store the received input image signal and the processed file in a volatile memory.

3. The electronic device as claimed in claim 2, wherein each of the classifiers corresponds to a predetermined type of scene images or a user-specific person or scene.

4. The electronic device as claimed in claim 3, wherein the privacy detection performed on the input image signal or the processed file by the controller generates a classification result indicating whether the processed file comprises the privacy information and whether the processed file is to be encrypted by the controller.

5. The electronic device as claimed in claim 3, wherein the camera device captures a video signal comprising the input image signal, and the controller is further configured to perform the codec process to encode the video signal to generate an encoded video file temporarily stored in the volatile memory,
wherein in response to the classification result of any image in the video signal indicating the encoded video file comprising the privacy information, the controller stops the codec process and starts another codec process to encode the video signal.

6. The electronic device as claimed in claim 5, wherein in response to a specific image in the video signal having the privacy information being encoded by the codec process, the controller discards a bitstream corresponding to the specific image in the processed file.

7. The electronic device as claimed in claim 3, wherein the camera device captures a video signal comprising the input image signal, and the controller is further configured to perform the codec process to encode the video signal to generate an encoded video file temporarily stored in the volatile memory,
wherein in response to the classification result of any image in the video signal indicating the encoded video file comprising the privacy information, the controller continues the codec process and encrypts the encoded video file temporarily stored in the volatile memory to generate the encrypted file.

8. The electronic device as claimed in claim 3, wherein the camera device captures a video signal comprising the input image signal, and the controller is further configured to perform the codec process to encode the video signal to generate an encoded video file temporarily stored in the volatile memory,
wherein in response to the classification result of any image in the video signal indicating the encoded video file comprising the privacy information, the controller prompts a software button indicating whether to encrypt the processed file temporarily stored in the volatile memory on a screen of the electronic device.

9. The electronic device as claimed in claim 1, wherein the privacy information comprises nude human bodies, texts, sexual scenes, underwear scenes, or a combination thereof.

10. The electronic device as claimed in claim 1, wherein the controller is further configured to store the encrypted file into a non-volatile memory.

11. A privacy-aware image-encryption method for use in an electronic device, wherein the electronic device comprises a camera device, the method comprising:
receiving an input image signal captured by a camera device;
performing a codec process on the input image signal to generate a processed file;
performing privacy detection on the input image signal or the processed file, wherein performing the privacy detection comprises using a classifier network including a plurality of classifiers; and
in response to the input image signal or the processed file being detected to include privacy information, encrypting the processed file to generate an encrypted file.

12. The method as claimed in claim 11, further comprising:
temporarily storing the received input image signal and the processed file in a volatile memory.

13. The method as claimed in claim 12, wherein each of the classifiers corresponds to a predetermined type of scene images or a user-specific person or scene.

14. The method as claimed in claim 13, further comprising:
performing the privacy detection performed on the input image signal or the processed file to generate a classification result indicating whether the processed file comprises the privacy information and whether the processed file is to be encrypted by the controller.

15. The method as claimed in claim 13, wherein the camera device captures a video signal comprising the input image signal, and the method further comprises:
performing the codec process to encode the video signal to generate an encoded video file temporarily stored in the volatile memory; and
in response to the classification result of any image in the video signal indicating the encoded video file comprising the privacy information, stopping the codec process and restarting another codec process to encode the video signal.

16. The method as claimed in claim 13, further comprising:
in response to a specific image in the video signal having the privacy information being encoded by the codec process, discarding a bitstream corresponding to the specific image in the processed file.

17. The method as claimed in claim 13, wherein the camera device captures a video signal comprising the input image signal, and the method further comprises:
performing the codec process to encode the video signal to generate an encoded video file temporarily stored in the volatile memory; and
in response to the classification result of any image in the video signal indicating the encoded video file comprising the privacy information, the controller continues the codec process and encrypts the encoded video file temporarily stored in the volatile memory to generate the encrypted file.

18. The method as claimed in claim 13, wherein the camera device captures a video signal comprising the input image signal, and the method further comprises:
performing the codec process to encode the video signal to generate an encoded video file temporarily stored in the volatile memory; and
in response to the classification result of any image in the video signal indicating the encoded video file comprising the privacy information, prompting a software button indicating whether to encrypt the processed file temporarily stored in the volatile memory on a screen of the electronic device.

19. The method as claimed in claim 11, wherein the privacy information comprises nude human bodies, texts, sexual scenes, underwear scenes, or a combination thereof.

20. The method as claimed in claim 11, further comprising:
storing the encrypted file into a non-volatile memory.

* * * * *